United States Patent [19]

Forte et al.

[11] 3,907,725
[45] Sept. 23, 1975

[54] ASBESTOS-FREE DRYWALL JOINT COMPOUND UTILIZING ATTAPULGITE CLAY AS ASBESTOS SUBSTITUTE

[75] Inventors: William B. Forte, Williamsville; Patrick J. Mudd, Buffalo, both of N.Y.

[73] Assignee: National Gypsum Company, Buffalo, N.Y.

[22] Filed: Feb. 26, 1973

[21] Appl. No.: 335,619

[52] U.S. Cl......... 260/17 R; 260/42.13; 260/42.55; 260/29.65; 260/29.6 PS
[51] Int. Cl.² ..... C08L 1/28; C08K 3/00; C08J 3/20
[58] Field of Search......... 260/17 R, 29.6 PS, 17 K, 260/42.13

[56] References Cited
UNITED STATES PATENTS

| | | | |
|---|---|---|---|
| 2,614,998 | 10/1952 | Lea | 260/29.6 PS |
| 3,003,979 | 10/1961 | Ptasienski | 260/29.6 PS |
| 3,016,713 | 1/1962 | Dening | 260/29.6 H |
| 3,256,223 | 6/1966 | Heijmer | 260/17 R |
| 3,297,601 | 1/1967 | Maynard et al | 260/17.4 |
| 3,303,147 | 2/1967 | Elden | 260/17 |
| 3,386,223 | 6/1968 | Weyworth | 260/17 R |
| 3,557,029 | 1/1971 | Bergeson | 260/8 |
| 3,617,573 | 11/1971 | Monogle | 210/54 |
| 3,835,074 | 9/1974 | Dumarais | 260/17 R |

OTHER PUBLICATIONS

Kirk Othmer Encyclopedia of Chem. Technol. 1964 – John Wiley – pp. 560–562.
"Applied Mineral Technology" – Grim (author) 1962 – McGraw Hill –pp. 376, 206, 207, 214–216.
"Sealants" – Adolfas Damusis, Editor – Reinhold Publishers Corp. – N.Y. – 1967 – p. 63 + p. 90.

Primary Examiner—Joseph L. Schofer
Assistant Examiner—Peter Kulkosky
Attorney, Agent, or Firm—Robert F. Hause

[57] ABSTRACT

Drywall joint compounds in which asbestos fiber has been omitted and the physical characteristics which have heretofore depended on the presence of asbestos fiber have been obtained by the inclusion of finely powdered attapulgite clay, and preferably a combination of attapulgite clay and polyacrylamide resin.

9 Claims, 1 Drawing Figure

US Patent Sept. 23,1975 3,907,725
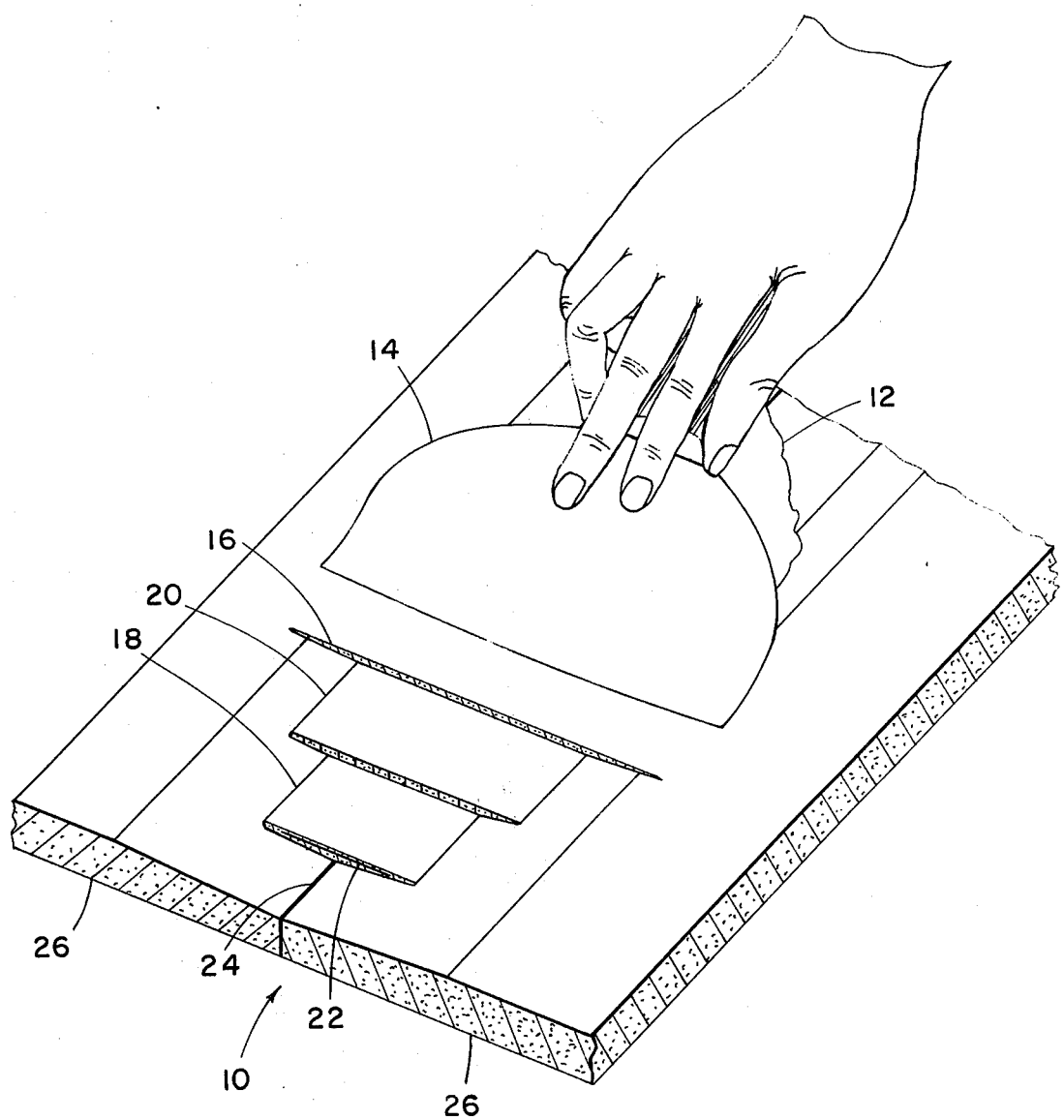

ASBESTOS-FREE DRYWALL JOINT COMPOUND UTILIZING ATTAPULGITE CLAY AS ASBESTOS SUBSTITUTE

This invention relates to drywall joint treatment compounds which have been improved only in an ecological sense. Drywall joint compounds have substantially all included a portion of asbestos fibers in the formulation. A definite effort is being made to eliminate asbestos fibers in products of all kinds, where these fibers have heretofore been commonly used, due to the belief that asbestos fibers, particularly if inhaled, are dangerous from a health standpoint.

Asbestos fibers have been considered an essential ingredient in joint compounds including the kinds sold in dry powder form for subsequent addition of water and the kinds sold as a ready-mixed aqueous paste. The asbestos fibers have been considered critical in order to obtain the following combination of characteristics all as desired for a preferred joint compound:

1. The plasticity of the paste
2. The water-holding capacity as related to what is referred to as open time and wet edge
3. The avoidance of excessive cohesiveness of the paste
4. Viscosity stability during mixing, storing and use The plasticity of a joint compound is seen in the ability of the paste to be easily shaped into a smooth surfaced layer with uniform tapered edges using a common broad knife. The water-holding capacity desired is such that when the paste is applied to a dry paper-covered gypsum board surface, the paste does not give up its water to the blotterlike effect of the gypsum board paper, at least for a time sufficient for a worker to complete his smoothing-out operation with the broad knife. The cohesiveness of the paste should be sufficient to prevent any tendencies of the paste to be pulled apart by the broad knife as the knife is being firmly pressed against the paste and pulled along the surface, however it should not resist the ease of deformation by the knife into the desired smooth coating formation. Although it is no problem to form a paste with an initial viscosity after mixing of substantially any form, the presence of asbestos fibers has been of importance in providing a paste which doesn't slowly but steadily change in viscosity subsequent to mixing or even during mixing, if, for example, mixing were inadvertently prolonged.

In accordance with the present invention, joint compounds are provided, free of asbestos, which provide all the characteristics of a joint compound with asbestos substantially as well as the joint compounds with asbestos. The asbestos of prior formulations is replaced by approximately the same weight of a fine powder attapulgite clay. A smaller quantity of polyacrylamide resin is also preferably added.

It is an object of the present invention to provide a novel formulation of a dry powder for use as a drywall joint compound.

It is an object of the present invention to provide a novel formulation of an aqueous paste for use as a drywall joint compound.

It is a further object to provide such joint compounds which are substantially free of asbestos.

It is a still further object to provide asbestosfree joint compounds which have good plasticity, water retention, cohesiveness and viscosity stability.

These and other objects and advantages of the invention will be more readily apparent when considered in relation to the preferred embodiments as set forth in the specification and the drawing in which a wallboard joint section is shown in perspective with joint compound made in accordance with the invention applied thereto and being applied thereto.

Referring to the drawing there is shown a short section of a drywall joint area 10 on which ready-mix joint compound 12 is being hand applied, using a broad knife 14, forming a smooth-surfaced top coat 16.

The joint compound 12 shown is made in accordance with the invention however it is applied in the same way, and appears the same, as prior joint compounds.

There are also shown a bed coat 18 of joint compound 12 and a first finish coat 20 of joint compound 12, both of which have hardened and dried prior to the application of the smooth-surfaced top coat 16. Bed coat 18 and first finish coat 20 can both be made from the same asbestos-free ready-mix joint compound 12 as is top coat 16. The bed coat 18 has a narrow paper joint tape 22 embedded within it to provide a reinforcement of the final joint treatment along the joint 24 between the two gypsum wallboards 26.

The joint compound 12 is an asbestos-free paste formulation suitable for manufacture in paste form, storage, shipment and then ultimate use, all as has been accomplished heretofore with asbestos-containing ready-mix joint compounds.

Joint compound 12 may be made in accordance with the following formulation:

|  | PARTS BY WEIGHT |
| --- | --- |
| Polyvinylacetate latex binder (58% solids) | 6.0 |
| Dipropylene glycol dibenzoate plasticizer | 0.55 |
| Fine ground limestone | 38.0 |
| Dry ground mica | 14.2 |
| Fine ground attapulgite clay | 1.5 |
| Polyacrylamide resin | 0.12 |
| Hydroxypropyl methylcellulose | 0.48 |
| Water | 39.15 |
|  | 100.00 |

The polyvinyl acetate binder employed was Union Carbide Latex WC 130. Many other binders can be substituted as is well known in the art, including other latex emulsions, starch, caseins, etc. Dipropylene glycol dibenzoate plasticizer, which is preferably used in conjunction with the polyvinyl acetate binder, was obtained as Benzoflex 9-88 from Velsicol Chemical Corporation.

The fine ground limestone had a fineness of between 80 and 99 percent through a 325 mesh U.S. Standard Sieve. The dry ground mica was Asheville Mica Company's grade AMC. The limestone, mica and the clay are all fine inorganic filler materials each contributing certain physical characteristics to the final product, as fine inorganic filler materials have in prior joint compounds.

The fine ground attapulgite clay is available from Engelhard Minerals and Chemicals Corporation and is identified as Attagel attapulgus clay, and is preferably Attagel 40. A typical chemical analysis of the Attagel 40 is:

| | |
|---|---|
| SiO$_2$ | 68.0% |
| Al$_2$O$_3$ | 12.0% |
| MgO | 10.5% |
| Fe$_2$O$_3$ | 5.0% |
| CaO | 1.7% |
| P$_2$O$_5$ | 1.0% |
| K$_2$O | 1.0% |
| TiO$_2$ | 0.7% |
| Trace Elements | 0.1% |
| | 100.0% |

The major constituents shown in the above analysis are combined as complex magnesium aluminum silicate and do not exist as free oxides.

The average particle size of the Attagel 40 is 0.14 micron, and 65 percent of the material is finer than 0.2 micron. There is about 12 percent free moisture and about 22 percent ignition loss at 1800°F. It has a pH in the range of 7.5 to 9.5, a specific gravity of 2.36 and has a light cream color.

The polyacrylamide resin can be obtained from Dow Chemical Company identified as Dow Resin 164. The polyacrylamide resin, used in combination with the attapulgite clay, in substitution for the asbestos of prior ready-mix joint compounds, has produced the nearest equivalent in respect to the physical properties to which asbestos has been known to contribute. Without the polyacrylamide, considerably more work must be expended in the mixing in order to cause the attapulgite clay to thicken sufficiently. Other floccing agents that can be substituted for polyacrylamide, with somewhat less success are Hercules Reten 210, a copolymer of acrylamide and an acrylic, or Union Carbide's Polyox WSR-35, a polyethylene oxide.

The hydroxypropyl methylcellulose may be Dow Chemical Company's Methocel HG 228, which provides a known thickening function in joint compounds. The amount of water may be varied, with variations in the amount of other ingredients, in order to provide the desired viscosity of joint compound, of about 400 to 700 Brabender units.

The following is a formulation for ready-mix joint compound which includes asbestos and functions closely similar to the formulation of the invention hereabove.

| | PARTS BY WEIGHT |
|---|---|
| Polyvinyl acetate latex binder (58% solids) | 6.1 |
| Dipropylene glycol dibenzoate plasticizer | 0.56 |
| Fine ground limestone | 39.2 |
| Dry ground mica | 14.7 |
| Asbestos (Union Carbide SG 210 Calidria) | 1.6 |
| Hydroxypropyl methycellulose | 0.49 |
| Water | 37.35 |
| | 100.00 |

As will be seen the two formulas are substantially the same except for the replacement of asbestos with attapulgite clay and the addition of some polyacrylamide resin with the attapulgite clay. The attapulgite clay can be used without the polyacrylamide resin in accordance with the invention, however it then becomes difficult to adjust the amount of other ingredients to obtain an acceptable plasticity, cohesiveness and viscosity.

Many other ingredients may be added to the formulation of a joint compound in accordance with the invention, all as are well known in the industry, including, for example, about 1 percent starch binder, about 5 percent non-fibrous talc, about 0.1 percent defoaming agent or about 0.5 percent propylene glycol antifreeze, or combinations thereof.

The mixing of the ingredients of the ready-mix joint compound 12 is of importance. In the preferred method, substantially all of the water is put into the mixer first. As the other ingredients are added, the mixing of the ingredients with the water and with each other is carried on. Approximately half of the limestone is withheld from the mixer until the other ingredients are all in the mixer being mixed.

Whereas the description above of what is shown in the drawing described a ready-mix joint compound 12, it will be understood that the drawing is also suitable for understanding the use of a dry powder formulation which is in accordance with the present invention. A dry powder formulation as disclosed herebelow may be mixed with water and is then used in exactly the same way as ready-mix joint compound 12.

A suitable dry powder formulation within the invention is as follows:

| | PARTS BY WEIGHT |
|---|---|
| Polyvinyl alcohol binder | 1.0 |
| Fine ground limestone | 38.0 |
| Dry ground mica | 14.0 |
| Fine ground attapulgite clay | 1.4 |
| Polyacrylamide resin | .12 |
| Hydroxypropyl methylcellulose | .48 |
| | 55.00 |

The above dry powder formulation, when mixed with about 45 parts by weight of water will produce an on-the-job mixture of joint compound which performs quite similar to prior dry powder formulations containing asbestos.

In order to compare the above formulation with a most comparable asbestos-containing formulation, the attapulgite clay and the polyacrylamide resin may be omitted and 1.4 parts of Union Carbide's SG 210 Calidria asbestos is added. The characteristics which are most important in evaluating a comparison of these products are ones which are not described in numerical values that can be compared. These characteristics are judged by feel and by actual use of the joint compounds and comparison of the finished products.

Minor amounts of dry preservative defoaming agents and other known additives may also be incorporated in the dry formulations made in accordance with the invention, similar to their use in prior asbestos-containing dry powder formulations.

Variations may be made in the relative content of the various ingredients in accordance with the invention. The ingredients of the dry powder formulation and the solids of the ready-mix paste may vary substantially as follows:

| | PERCENTAGE BY WEIGHT |
|---|---|
| Fine ground fillers | 50 – 99 |
| Binder | 1 – 50 |
| Thickener | .1 – 5.0 |
| Attapulgite clay | .1 – 5.0 |

The formulations will also contain a floccing agent for the clay, such as about 0.1 to 5.0 parts by weight of polyacrylamide resin for every 10 parts attapulgite clay.

Joint compounds made in accordance with the invention have been found to approach the characteristics and qualities of prior joint compounds containing asbestos closer than any other known asbestos-free formulation.

Having completed a detailed disclosure of the preferred embodiments of our invention, so that others may practice the same we contemplate that variations may be made without departing from the essence of the invention.

We claim:

1. A drywall joint compound, said compound being free of asbestos fiber, and comprising as dry solids, by weight, from about 50 to 99 percent of fine ground powdered fillers of about minus 325 mesh particle size and other than attapulgite clay, from about 1 to 50 percent of a binder composition for said filler, from about 0.1 to 5 percent of a thickener other than attapulgite clay, from about 0.1 to 5 percent fine powdered attapulgite clay and a floccing agent for said clay in an amount of about 0.1 to 5.0 parts by weight for every 10 parts by weight of attapulgite clay.

2. A drywall joint compound as in claim 1 wherein said floccing agent is a polyacrylamide resin.

3. A dry powder joint compound formulation as defined in claim 1 comprising about 50 parts by weight fine powdered filler, about 1 part by weight polyvinyl alcohol, about 1 part by weight fine powdered attapulgite clay, about 0.1 part by weight floccing agent for said clay and about 0.5 part thickener.

4. A dry powder joint compound formulation as defined in claim 3 wherein said floccing agent is a polyacrylamide resin.

5. A ready-mix joint compound as defined in claim 1 wherein said dry solids are thoroughly mixed in a paste with sufficient water to produce a paste viscosity of about 400 to 700 Brabender units.

6. A ready-mix joint compound as defined in claim 5 comprising about 50 parts by weight fine powdered filler, about 6 parts by weight polyvinylacetate latex binder, a minor amount of plasticizer for said binder relative to the amount of said binder, about 1 part by weight attapulgite clay, about 0.1 part by weight floccing agent for said clay, about 0.5 part by weight thickener and about 40 parts by weight of water.

7. A ready-mix joint compound as defined in claim 6 wherein said floccing agent is a polyacrylamide resin.

8. A drywall joint compound as defined in claim 1 wherein said attapulgite clay has a particle size such that a major portion of the material is finer than about 0.2 micron.

9. The method of making a ready-mix joint compound as defined in claim 5 comprising the steps of placing a substantial portion of said water in a mixer first, adding the other ingredients except a substantial portion of the fine powdered filler second, after mixing thereof then adding the balance of the fine powdered filler, and then mixing all of the ingredients thoroughly.

* * * * *